Dec. 28, 1937.  H. KAUPP  2,103,906
CONVEYER MECHANISM
Filed July 26, 1933  4 Sheets-Sheet 1

INVENTOR
HENRY KAUPP
BY
Harold D. Penney ATTORNEY

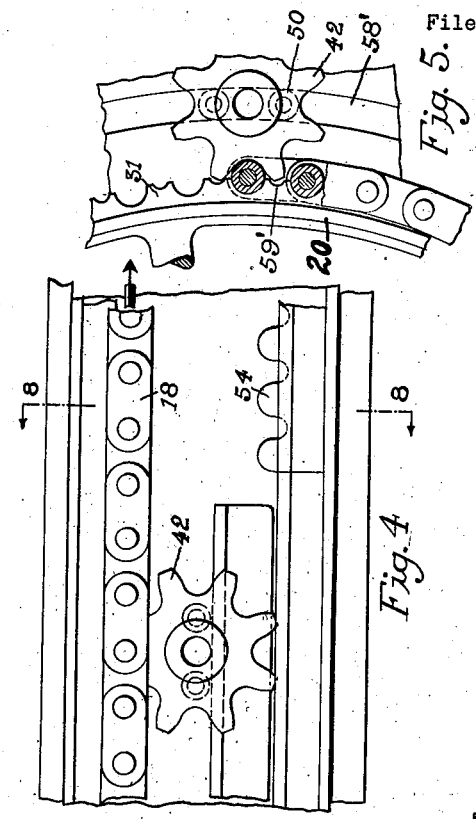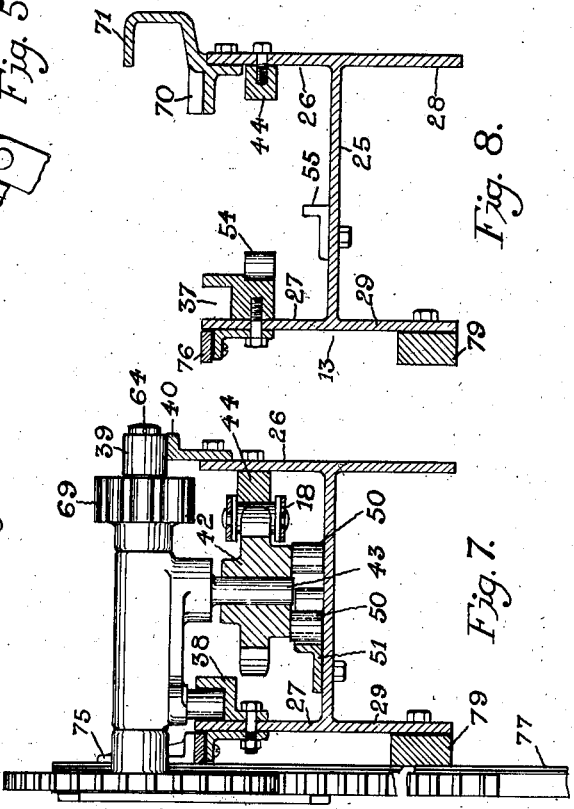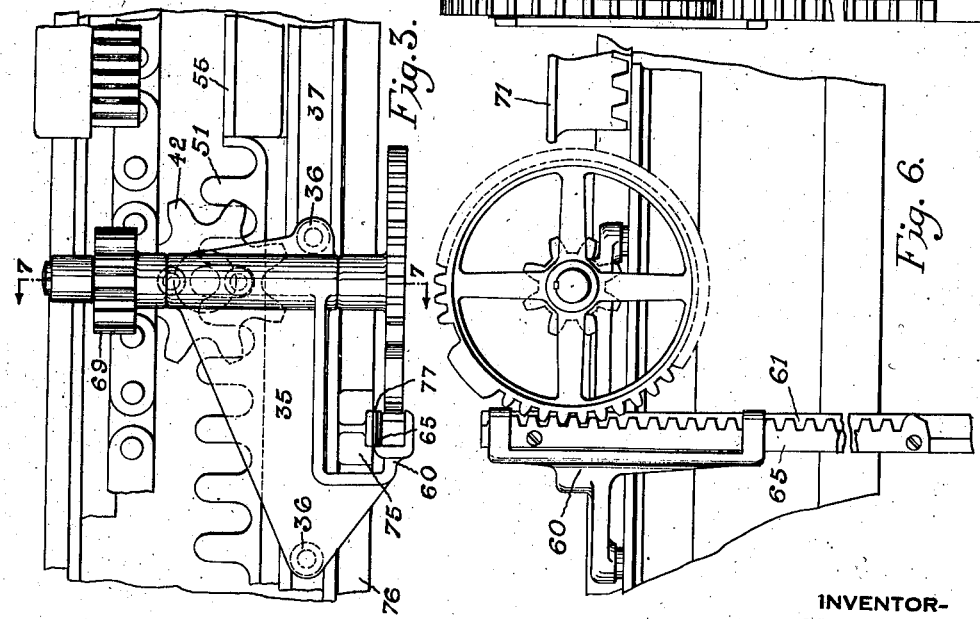

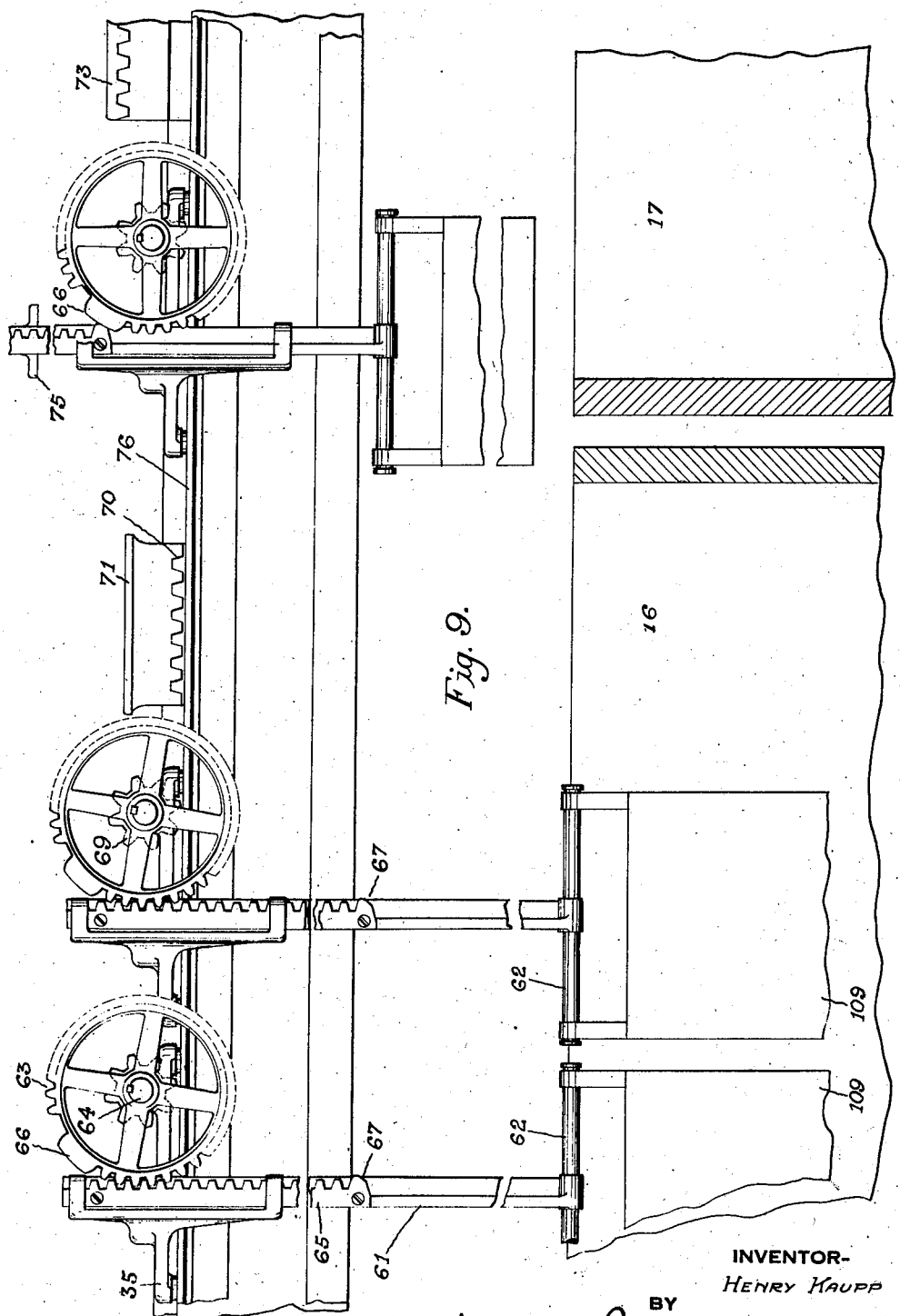

Dec. 28, 1937.   H. KAUPP   2,103,906
CONVEYER MECHANISM
Filed July 26, 1933   4 Sheets-Sheet 4

INVENTOR-
HENRY KAUPP
BY
Harold D. Penny
ATTORNEY-

Patented Dec. 28, 1937

2,103,906

UNITED STATES PATENT OFFICE 2,103,906

CONVEYER MECHANISM

Henry Kaupp, Long Island, N. Y., assignor to U. S. Galvanizing & Plating Equipment Corporation, Brooklyn, N. Y., a corporation of West Virginia Application July 26, 1933, Serial No. 682,199

29 Claims. (Cl. 204—5)

This invention relates to conveying mechanisms and more particularly to endless chain conveyers for plating and cleaning apparatus, and to conveyers of general application, it being noted that in many of the claims the invention is not limited to plating or cleaning machines or to machines for liquid treatments.

One object of the invention is to provide an improved apparatus of this kind having an endless chain conveyer of constant speed, so arranged that the carriers propelled by conveyer may be advanced at different speeds although the conveyer speed remains constant.

Other objects of the invention are to provide an improved device of this kind for use in conjunction with apparatus for cleaning, electroplating, and the like and having means for raising and lowering material out of and into, the various baths and the like.

Other objects of this invention are to provide a conveying mechanism in which:

The work-carriers are positively propelled in a definite path and are at all times positively meshed with the conveying means, thereby eliminating the possibility of becoming detached.

The carriers while conveying, lifting and lowering the work through the entire operating cycle, are in constant mesh with a single conveying means, thus assuring synchronization of the moving parts of the apparatus.

A very valuable feature resides in the fact that the speed of the carriers may be greatly increased at the ends of the apparatus and at points of transfer from one tank to another, so that during transfer a carrier may travel faster than the following carrier; and means are provided for maintaining a parallel relation between work racks or holders particularly when the work holder is raised, and to eliminate swinging of work holders, whereby the clearance space between the work and ends of tanks, and size of the tanks, may be reduced to a minimum, thereby decreasing the total length of apparatus.

The lifting and lowering operations are entirely independent of each other and therefore permit individual adjustment as to the time or amount each work holder is raised or lowered, and also the time and distance the work holder travels in elevated position.

The speed at which the carriers travel is variable and the carriers may be temporarily brought to rest at any point, thus making it possible to carry the work faster at points of transfer, thereby shortening the time the work is exposed in the air, thus eliminating or reducing oxidation.

A slow speed or temporary stop may be desirable for draining, spraying, or other operations.

It is possible to so construct the conveying means that they may be freely lubricated or run in oil without danger of getting lubricant in the baths, at the same time protecting the conveyer mechanism from corroding fumes.

Other objects are to provide extreme adjustability and flexibility as to carrier spacing and timing the various operations.

Additional objects of the invention are to insure good bus-bar contacts at all times and to improve generally the simplicity and efficiency of such apparatus and to provide apparatus of this kind which is economical, durable, positive and reliable in operation, and economical to manufacture and install.

Still other objects of the invention will appear as the description proceeds; and while herein details of the invention are described in the specification and some of the claims, the invention is not limited to these; since many and various changes may be made without departing from the scope of the invention as claimed in the broader claims.

The inventive features for the accomplishment of these and other objects are shown herein in connection with an intermittent variable speed conveyer system which, briefly stated, includes a constantly driven conveyer chain with which mesh control sprockets rotatably mounted on respective carriers, each sprocket comprising gear portions of different diameter. Non-traveling control rack members of limited length disposed along the chain are adapted one at a time to mesh with the gear portions of the moving sprocket to cause the carriers to travel at different speeds. Control rail-members engageable with the control sprocket, while the rack members are not thus engaged, hold the sprocket from rotation to cause the carrier to travel with the same speed as the chain.

Certain of said control members may be longitudinally separated, to leave the control sprocket free to rotate, to permit the carrier to come to rest until pushed forward to the next control member by the succeeding carrier which in turn thus comes to rest.

An upright work-carrying bar is vertically slidable on each carrier; and the carrier means cooperate with the bar and a non-traveling member to lower and raise the work into and from treating tanks.

In the accompanying drawings showing, by way of example, two of many possible embodiments of the invention, Fig. 1 is a plan of the apparatus, the carriers being removed;

Fig. 3 is a plan of a portion of the track showing one carrier and transfer means;

Fig. 4 is a fragmental plan of another portion of the track;

Fig. 5 is a plan showing a portion of the end of the apparatus;

Fig. 6 is a fragmentary side elevation of the transfer means of Fig. 3;

Fig. 7 is a sectional view taken on the line 7—7 of Fig. 3;

Fig. 8 is a sectional view taken on the line 8—8 of Fig. 4, parts being removed;

Fig. 9 is a side elevation of a portion of the apparatus showing transfer means and sections of the ends of two tanks.

Figure 1:
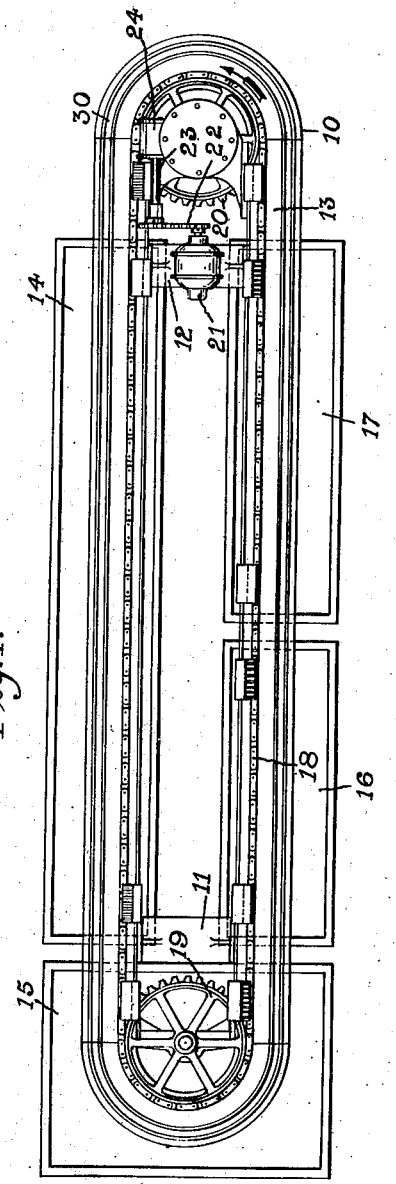

The principal features of the intermittent variable speed conveyer system will first be very briefly pointed out, and then the system will be described in detail. Briefly stated the system comprises a constantly driven conveyer chain 18 (Figs. 1 and 3) with which mesh control sprockets 42 rotatably mounted on respective work carriers 35. The teeth of each sprocket and lower rollers 50 comprise gear portions of different diameter adapted to engage with control rack members 51, 54 of limited length disposed along the chain and adapted one at a time to mesh with the gear portions to cooperate with the moving chain to cause the carriers to travel at different speeds. Control rail members 55 engage with the control sprocket, while the rack members are not engaged, to hold the sprocket from rotation to cause the carrier to travel with the same speed as the chain.

Certain of said control members may be longitudinally separated as at 57 (Fig. 2) to leave the control sprocket free to rotate to permit the carrier to come to rest until pushed forward into engagement with the next control member by the succeeding carrier which in turn comes to rest.

An upright work carrying bar 61 vertically slidable on each carrier 35 carries means 63, 65 cooperating with the carrier and non-traveling members 70, 71 to raise or lower said bar from and into treating tanks 14, 15, 16, 17.

Now the apparatus will be described in detail.

The various parts of the apparatus are carried on an endless track 10 (Fig. 1) mounted on brackets 11, 12 mounted on suitable standards (not shown), the track being, as here shown, disposed above tanks 14, 15, 16 and 17 of a plating or cleaning apparatus. The endless constantly moving conveyer chain 18 is guided around sprockets 19 and 20 mounted on the respective brackets 11, 12, the sprocket 20 being driven by a motor 21 through a chain 22, shaft 23, and worm gear unit 24, the latter driving the shaft of the sprocket 20. The direction of travel is indicated by the arrow.

The endless track 10 comprises a pair of side tracks each comprising a horizontal web 25 (Fig. 8) and inner and outer upper and lower flanges 26, 27, 28, 29. Semicircular end members 30 (Fig. 1) of cross section somewhat similar to that of Fig. 8 connect adjacent ends of said side tracks.

Carriers 35 (Fig. 3) are guided on the track by rollers 36 mounted on the lower part of the ends of the carrier and riding in a groove 37 formed by an angle strip 38 (Fig. 7) cooperating with the flanges 27. A transverse shaft 64 carries a roller 39 riding on a rail 40 on the flange 26 to aid in supporting the carrier.

A control sprocket 42 rotatably mounted on a pending bearing stud 43 of the carrier 35, is at times rotated by the constantly moving conveyer chain 18 with which it is held in constant mesh by a guide rail 44 on the flange 26.

Each control sprocket 42 is in constant mesh with the conveyer chain, and each is provided on its lower face with a pair of downwardly pointed rollers 50 at times serving as gear members when in engagement with the teeth of one or more horizontal control rack members 51 of limited length secured on said web 25 in position to mesh with said rollers, thereby to cooperate with the moving chain to rotate the sprockets and cause the carrier to travel at a slow speed.

Other control rack members 54 (Figs. 4 and 8) mounted on the outer upper flange 27 are adapted to mesh with said sprocket, when said rollers are out of mesh, to cause the carrier to travel at medium speed.

A control rail member 55 is mounted on said web for engagement with said rollers when the rack members are not engaged and serves to hold the sprocket from rotation, thereby to cause the sprocket to travel with and at the speed of, the conveyer chain 18.

Figure 2:
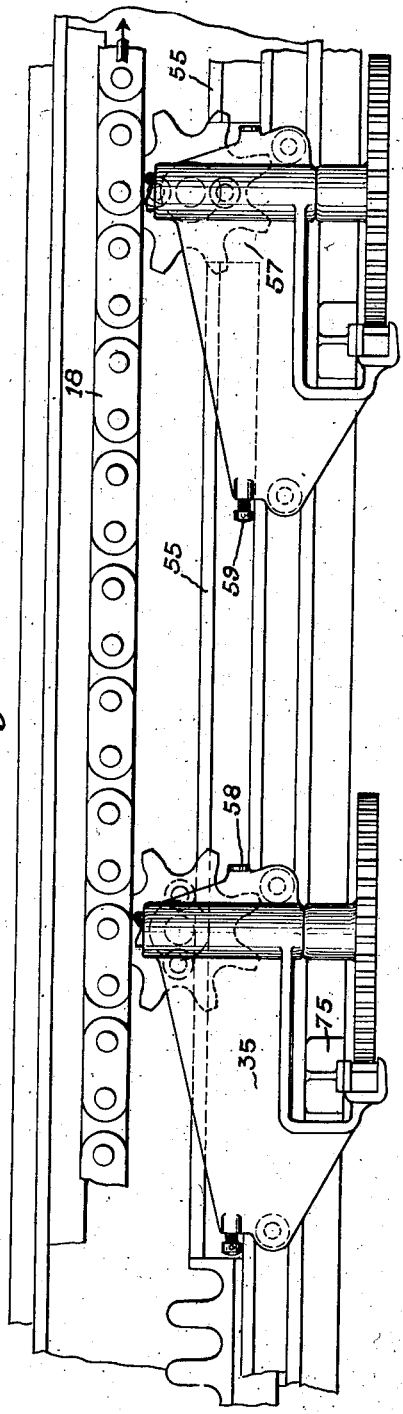
Fig. 2 is a fragmental plan of a portion of the carrier track with two carriers thereon.

Certain of said control members, as the members 51 and 55 of Fig. 3, are adjacent to each other, whereby there is no pause in the control spocket as the latter passes from one member to the next. On the other hand, certain of said control members such as members 55 of Fig. 2 are longitudinally separated, thereby to leave a space 57 in which the control sprocket and rollers are free of engagement with the control members, in which position the sprocket may turn idle and rotate freely while the carrier is frictionally stopped until pushed forward by the projection 58 of a succeeding carrier engaging against an adjusting screw 59, thereby to push the sprocket or rollers forward into engagement with the control rail-member 55 next ahead thereby to cause the carrier to travel forward under the action of the conveyer chain.

Such a temporary pause may also be effected at the end of the rack 51 or rack 54 or at any intermediate position or wherever enough clearance is provided for the sprocket to rotate idle.

When going around the semicircular ends 30 of the track the sprocket 42 is kept from rotating by the rollers 50 riding in a groove 58' (Fig. 5), the teeth 31 of sprocket 20 being notched or otherwise shaped, as at 59' to clear the teeth of sprocket while the latter rides around the ends of the apparatus, at high speed.

A bracket 60 (Figs. 3 and 6) on each carrier vertically guides an upright carrying bar 61 having at its lower end a supporting bar 62 (Fig. 9) a work rack or holder 109.

A large gear 63 carried on the transverse shaft 64 on each carrier is adapted to mesh with a rack 70 65 mounted on each bar 61, and is provided with a concentric part 66 (right of Fig. 9) adapted to engage under the beveled lower end 67 of the rack at the upper limit of movement of the rack, thereby to lock the bar raised. A pinion 69 fast on the other end of said shaft 64 engages a stationary horizontal rack 70 disposed along said track in position to engage the lower side of said pinion to rotate the pinion and cause the gear 63 to raise said bar, and thereby raise the work holder 109 from the tank, for instance, the tank 16.

A rail 71 above the rack 70 (Figs. 8 and 9) serves as a guide for the roller 39 to prevent the gear 69 from coming out of engagement with the rack 70 during the lifting operation. An additional stationary rack 73 (Fig. 9) further along the path of the carrier engages the upper side of the pinion 69 to lower the bar 61, to lower the work into the next tank, such as the tank 17.

The bar 61 is limited in its downward movement by an insulated bracket 75 (Figs. 3, 7, and 9), carried on and insulated from said bar, coming into engagement with a rail or insulated bus bar 76 on which it rides as the carriers travel from left to right of Fig. 9. The bar 61 carries an insulated copper strip 77 (Figs. 3 and 7) electrically connecting the bracket 75 with the usual supporting rod 62 on which the work holder 109 hangs, thereby electrically connecting the work with the bus-bar. Said strip 77 (Fig. 7) also engages a bus bar 79 mounted on, and insulated from, the flange 29, thus minimizing danger of faulty plating due to a faulty bus-bar contact at either bus bar.

Said bus bars are, in the usual manner, provided with connections for connecting to a suitable source of current, to charge the bus bars at the parts over the tanks where the particular process used requires that the bus bars be charged.

The operation of the apparatus will be understood by those skilled in the art. The control members 51, 54, and 55 are detachable and may be secured in place wherever needed to give the desired speeds and pauses to the articles passing through the apparatus. The speeds and pauses may be adjusted to suit the particular treatment required.

The invention is not limited to plating and treating apparatus, but is broad enough to include other elements besides carriers to which it is desired to impart different speeds and pauses.

Figure 12:
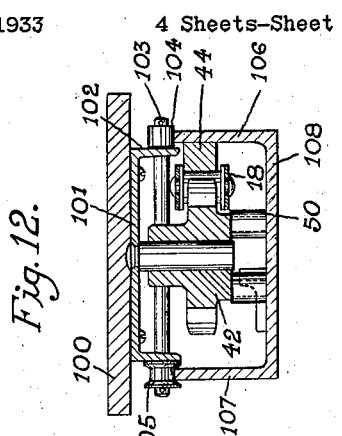
Fig. 12 is a sectional view taken on the line 12—12 of Fig. 10.
Figure 11:
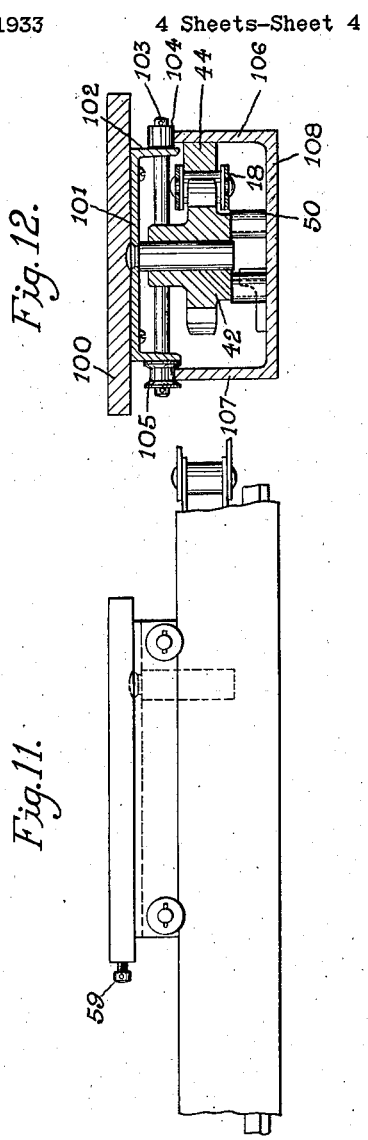
Fig. 11 is a side elevation showing a carrier of Fig. 10.
Figure 10:
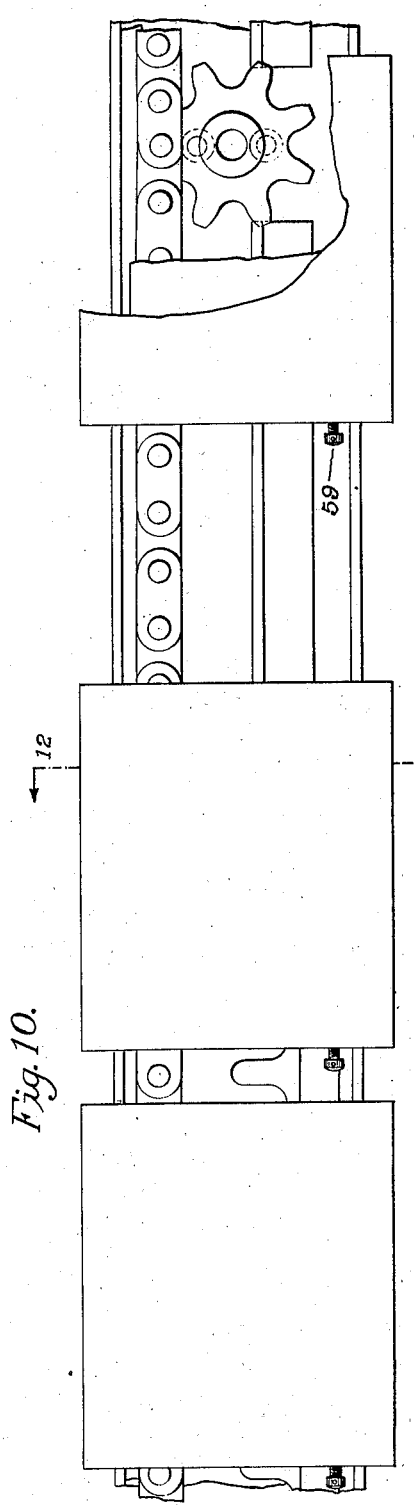
Fig. 10 is a fragmental plan of a portion of a conveyer of another embodiment of the invention.

In Figs. 10 to 12, is shown an apparatus carrying movable platforms 100 mounted on carriers 101 having downturned ears 102 receiving a shaft 103 carrying rollers 104, 105 guided on the edges of flanges 106, 107 of the track 106, 107, 108, the roller 105 being grooved.

The parts 18, 42, 50, 51 operate as in the other figures, racks 51, 54 and rail 55 may be provided or omitted as desired to give the required changes, the travel operation being similar to that of the other embodiment.

In both cases, the webs and channels 25, 26, 27 and 108, 106, 107 may serve as a container for lubricating oil for lubricating the racks 54 and other moving parts and to retain the lubricating oil.

In all of the species herein, it is noted that the detachable control members 51, 54, and 55 may be secured at any point desired, and that the carriers themselves may be lifted off and replaced, at any desired place or distance apart, without the use of tools, thus providing extreme flexibility of arrangement to suit all conditions and materials.

I claim as my invention:

1. In combination, a constantly driven conveyer chain; carriers guided one after another, along said chain; a control sprocket rotatably mounted on each carrier and meshing with the chain and comprising gear portions of different diameters; and control members engaging the sprocket member one at a time only and including control rack members of limited length adapted to mesh with said gear portions.

2. In combination, an endless track; a constantly driven conveyer chain disposed along said track; carriers guided on said track; a control sprocket rotatably mounted on each carrier and having teeth in constant mesh with the conveyer chain, the sprocket being provided with rollers on its lower part forming additional gear members fewer in number than said teeth; a stationary horizontal control rack member of limited length adapted to mesh with said rollers thereby to cooperate with the chain to cause the carriers to travel at a slow speed.

3. In combination, a constantly driven conveyer chain; carriers guided with said chain, one after another; a control sprocket member rotatably mounted on each carrier; control rail members of limited length adapted to hold the sprocket member from rotation; said control members being longitudinally separated, to leave the control sprocket free.

4. In combination, a constantly driven conveyer chain; carriers guided one after another, along said chain; a control sprocket rotatably mounted on each carrier and comprising downwardly pointed rollers, said rollers and the sprocket teeth constituting gear portions of different diameters; control members engaging the sprocket member one at a time only and including control rack members of limited length adapted to mesh with said gear portions, and a control rail member engageable with the rollers to hold the sprocket from rotation; certain of said control members being longitudinally separated, thereby to leave the control sprocket and rollers free of engagement with the members whereupon the sprocket may rotate freely and the carrier may be frictionally stopped until pushed by a succeeding carrier to push the sprocket or rollers into engagement with the control member next ahead.

5. In combination, a constantly driven conveyer chain; carriers guided one after another, along said chain; a control sprocket rotatably mounted on each carrier and meshing with the chain and comprising gear portions of different diameters; and control members engaging the sprocket member one at a time only and including control rack members of limited length adapted to mesh with said gear portions and a control member engageable with the sprocket to hold the sprocket from rotation.

6. In combination, an endless track; a constantly driven conveyer chain disposed along said track; carriers guided on said track; a control sprocket rotatably mounted on each carrier and having teeth in constant mesh with the conveyer chain, the sprocket being provided with rollers on its lower part forming additional gear members fewer in number than said teeth; a stationary horizontal control rack member of limited length adapted to mesh with said rollers thereby to cooperate with the chain to cause the carriers to travel at a slow speed; stationary control rack members adapted to mesh with said teeth when said rollers are out of mesh to cause the carrier to travel at medium speed; and a stationary control rail member mounted for engagement with said rollers when the rack members are not engaged to hold the sprocket from rotation, to cause the sprocket to travel with the speed of the conveyer chain; certain of said control members being longitudinally separated, to leave the control sprocket free and the carrier at rest until pushed by a succeeding carrier to push the sprocket or gear members into engagement with the control member next ahead.

7. In combination, a constantly driven conveyer chain; carriers guided one after another, along said chain; a control sprocket rotatably mounted on each carrier and comprising gear portions of different diameters; control members engaging the sprocket member one at a time only and including control rack members of limited length adapted to mesh with said gear portions, and a control member engageable with the sprocket to hold the sprocket from rotation; certain of said control members being longitudinally separated, to leave the control sprocket free at the place of separation; and adjustable means on each carrier to push the next carrier from said place.

8. In combination, an elongated frame comprising an endless track; large sprockets at the ends of the frame, one being a drive sprocket; a conveyer chain disposed along said track and around said sprockets; carriers guided on said track; a control sprocket member rotatably mounted on each carrier and comprising portions of different diameter and engaged with said chain on the opposite side from said large sprockets; and control rack members of limited length adapted to engage with the gear portions to vary the speed of the carrier; the teeth of said large sprocket being shaped to avoid contact with the teeth of the control sprocket.

9. In combination, a track; a constantly driven conveyer chain on said track; carriers on said track; a control sprocket member rotatably mounted on each carrier and comprising gear portions of different diameter; a guide rail on said track holding the chain in mesh with the sprockets; and control rack members of limited length adapted to engage with the gear portions to vary the speed of the carrier.

10. In combination, traveling carriers; a bracket on each carrier; an upright bar vertically slidably carried by said bracket and carrying a work holder at its lower end; a rack carried on each bar; a transverse shaft on each carrier; a large gear carried on said shaft adapted to mesh with said rack and provided with a concentric part adapted to engage under the end of the rack at the upper limit of the rack, thereby to lock the bar raised; a pinion fast on the other end of said shaft; and a stationary horizontal rack disposed in position to engage one side of, and rotate said pinion to cause the gear to raise said bar.

11. In combination, a carrier; an upright carrying bar vertically slidable on said carrier and carrying a toothed rack and a work holder; a transverse shaft on said carrier; a gear on said shaft adapted to mesh with said rack; a pinion fast on said shaft; stationary horizontal racks disposed along said track in position to engage one side or the other of said pinion and rotate said pinion to cause the gear to raise or lower said bar; means to hold said pinions in mesh with said stationary racks as the pinions pass; a longitudinal bus bar adjacent to the path of said carrier; and a bracket on each bar electrically connected to the work holder and engageable with the top of the bus bar to limit the downward movement of the bar.

12. In combination, a pair of side beams each comprising a horizontal web and inner and outer upper and lower flanges; semicircular end members connecting adjacent ends of said side beams; sprockets coaxial with said members, one being a drive sprocket; a conveyer sprocket chain passed around said sprockets; a guide rail on each inner upper flange engaged between the upper and lower links of the chain to guide the latter; carriers guided on said beams and members and each comprising a downwardly pointed bearing stud; a control sprocket on each stud in constant mesh with the conveyer chain, and each provided on its lower face with a pair of downwardly pointed rollers serving as gear members; horizontal control rack members of limited length secured on said web and adapted to mesh with said rollers, thereby to cooperate with the chain to rotate the rollers and cause the sprocket to rotate at a slow speed; control rack members mounted on the outer upper flange adapted to mesh with said sprocket when said rollers are out of mesh to cause the carrier to travel at medium speed; and a control rail member mounted on said web for engagement with said rollers when the rack members are not engaged to hold the sprocket from rotation, to cause the sprocket to travel with the speed of the conveyer chain.

13. In combination, a track comprising a web and upstanding flanges, a guide rail disposed along one flange; a constantly driven conveyer chain guide on said rail; carriers having rollers guided on the edges of the flanges; a platform on the carrier; a control sprocket rotatably mounted on the lower part of the carrier in constant mesh with the conveyer chain; and means cooperating with the chain and sprocket to drive the carrier.

14. In combination, a track having upright longitudinal flanges; a constantly driven conveyer chain on said track between the flanges; carriers on said track on said flanges; a control sprocket member rotatably mounted on each carrier and comprising gear portions of different diameter; and control rack members of limited length adapted to engage with the gear portions to vary the speed of the carrier, said track and flanges constituting an oil container to permit free lubrication of said sprockets and moving parts and retain the lubricating oil.

15. In combination, a plurality of carriers; conveying means connected to the carriers for conveying the carriers in a path comprising deeply curved portions and portions free of deep curves; and means associated with the carriers and conveying means for causing the carriers at the point of connection with the conveyer to be conveyed at greater speed relative to the speed of the conveying means at said curved portions than at some other portions.

16. In combination, a track having a longitudinal groove; a constantly driven conveyer chain on said track exterior to said groove; carriers supported on said track independently of the chain and having rollers guided in said groove the chain being supported on the track independently of the support of the carrier; and means establishing driving connection between the chain and carriers.

17. In combination, a track having therein a longitudinal groove and comprising a web and side flanges upstanding therefrom to form a trough adapted to hold oil; a conveyer chain in said trough and oil; carriers on said track having rollers guided in said groove, one after another; and means cooperating with the chain to drive the carriers.

18. In combination, traveling carriers; a substantially upright carrying rack bar vertically slidable on each carrier; a non-traveling rack member; and gear means carried by the carrier and comprising rigidly connected gears meshing respectively with the bar and the non-traveling member to raise or lower the bar.

19. In combination, a longitudinally movable elongated conveyer; a movable control member engageable with the conveyer at a point of engagement; means adapted to cooperate with the movable member to cause the movable member to be moved by the conveyer and to cause the movable member and said point of engagement to move relative to the conveyer longitudinally of the conveyer, thereby to give the movable member a speed along the conveyer different from that of the conveyer; and a carrier movable along the conveyer by the movable member.

20. In combination, a longitudinally movable elongated conveyer; a movable control member engageable with the conveyer at a point of engagement movable along the conveyer with the conveyer or having free or partially free relative movement relative to the conveyer and longitudinally thereof; means adapted to cooperate with the movable member to cause the movable member and said point of engagement to move with the conveyer at the same speed as the conveyer, and to cause the movable member and said point to effect relative movement with the conveyer longitudinally of the conveyer, thereby to give the movable member a speed different from that of the conveyer; and a carrier movable along the conveyer and carried along the conveyer by the movable member.

21. In combination, a longitudinally movable elongated conveyer; a movable control member engageable with the conveyer at a point of engagement movable along the conveyer with the conveyer or having free or partially free relative movement relative to the conveyer and longitudinal thereof; means to cooperate with the movable member to cause the movable member to engage with the conveyer with a non-slipping engagement with the conveyer to cause the movable control member to move with the conveyer at the same speed as the conveyer; another means to cooperate with the movable member to cause the movable member to engage the conveyer with an engagement effecting relative movement between the conveyer and the point of said engagement, longitudinally of the conveyer, thereby to give the movable member a speed different from that of the conveyer; and a carrier movable along the conveyer and carried along the conveyer by the movable member at the same linear speed as the movable member; whereby the carrier may be caused to move along the conveyer at the same or a different speed.

22. In combination, a longitudinally movable elongated conveyer; a movable control member engageable with the conveyer at a point of engagement movable along the conveyer with the conveyer or having free or partially free relative movement relative to the conveyer and longitudinal thereof; a non-traveling control member of limited length adapted, progressively along its length, to cooperate with the movable member to cause the movable member to engage with the conveyer with a non-slipping engagement with the conveyer to cause the movable control member to move with the conveyer at the same speed as the conveyer; another non-traveling control member of limited length adapted progressively along its length to cooperate with the movable member to cause the movable member to engage the conveyer with an engagement effecting relative movement between the conveyer and the point of said engagement, longitudinally of the conveyer, thereby to give the movable member a speed different from that of the conveyer; and a carrier movable along the conveyer and carried along the conveyer by the movable member at the same linear speed as the movable member; whereby the carrier may be caused to move along the conveyer at the same or a different speed; said non-traveling control members being longitudinally separated, to leave the movable control member free of said cooperation between the non-traveling members thereby to allow the movable member and the carrier to come to rest.

23. In combination, a longitudinally movable elongated conveyer; a movable control member engageable with the conveyer at a point of engagement movable along the conveyer with the conveyer or having free or partially free relative movement relative to the conveyer and longitudinal thereof; a non-traveling control member of limited length adapted progressively along its length to cooperate with the movable member to cause the movable member to engage the conveyer with an engagement effecting relative movement between the conveyer and the point of said engagement, longitudinally of the conveyer, thereby to give the movable member a speed different from that of the conveyer; another non-traveling control member of limited length adapted progressively along its length to cooperate with the movable member to cause the movable member to engage the conveyer with an engagement effecting relative movement between the conveyer and the point of said engagement, longitudinally of the conveyer, to give the movable member a speed relative to the conveyer different from the speed caused by the first named control member; and a carrier movable along the conveyer and carried along the conveyer by the movable member at the same linear speed as the movable member, whereby the carrier may be caused to move with or a different speed from the conveyer; said non-traveling control members being longitudinally separated, to leave the movable control member free of said cooperation between the non-traveling members thereby to allow the movable member and the carrier to come to rest.

24. In combination, a track having upright flanges forming a longitudinal groove closed at the sides and bottom; a conveyer chain guided along said track; carriers movably engaging on said track and having upright shafts with rollers thereon guided in said groove, entirely above the bottom thereof, one after another; and means cooperating with the chain to drive the carriers.

25. In combination, a conveyer chain; a carrier; connecting means engaging the chain and operatively connecting the carrier with the chain; and means for shifting, along the chain relative to the chain while the chain travels, the point of engagement of the connecting means with the chain, and maintaining said engagement with the chain during and throughout such shifting.

26. In combination, carriers; a substantially upright carrying rack bar vertically slidable on each carrier having a metal plate on the side having a work holder on the lower end; non-traveling rack members; and gear means carried by the carrier and comprising rigidly connected small and large gears respectively meshing with the bar and the non-traveling members to raise or lower the bar; a metallic bracket on the side of an upper part of the bar; a supporting metallic bus bar longitudinal to the path of the carriers and on which said bracket rests to support the upright bar when the latter is lowered; and an additional metallic bar longitudinal to said path engaging said plate.

27. In combination, carriers; a substantially upright carrying rack bar vertically slidable on each carrier having a metal plate on the side having a work holder on the lower end; non-traveling rack members; and gear means carried by the carrier and comprising rigidly connected small and large gears respectively meshing with the bar and the non-traveling members to raise or lower the bar; a metallic bracket on the side of an upper part of the bar; a supporting metallic bus bar longitudinal to the path of the carriers and on which said bracket rests to support the upright bar when the latter is lowered; and an additional metallic bus bar longitudinal to said path engaging said plate.

28. In combination, a conveyer chain; carriers; connecting means engaging the chain and operatively connecting each carrier with the chain; means for shifting, forwardly along the chain relative to the chain while the chain travels, the point of engagement of the connecting means with the chain, while maintaining said engagement with the chain during and throughout such shifting, thereby increasing the speed of the carrier; a substantially upright carrying rack bar vertically slidable on each carrier having a metal plate on the side having a work holder on the lower end; non-traveling rack members; and gear means carried by the carrier and comprising rigidly connected small and large gears respectively meshing with the bar and the non-traveling members to raise or lower the bar; a metallic bracket on the side of an upper part of the bar; a supporting metallic bus bar longitudinal to the chain and on which said bracket rests to support the upright bar when the latter is lowered; and an additional metallic bus bar engaging said plate; said non-traveling rack member being disposed relative to said means for shifting in position to cause the upright bar to be raised when the carrier speed is increased, thereby to quickly raise the work holder.

29. In combination, carriers; means for conveying the carriers; means increasing the speed of the carriers at a point of their path; a substantially upright carrying rack bar vertically slidable on each carrier having a metal plate on the side having a work holder on the lower end; non-traveling rack members; and gear means carried by the carrier and comprising rigidly connected small and large gears respectively meshing respectively with the bar and the non-traveling members to raise or lower the bar; a metallic bracket on the side of an upper part of the bar; a supporting metallic bus bar longitudinal to said path and on which said bracket rests to support the upright bar when the latter is lowered; and an additional metallic bus bar parallel to said path and engaging said plate; said non-traveling rack member being disposed relative to said point in position to cause the upright bar to be raised when the carrier speed is increased, thereby to quickly raise the work holder.

HENRY KAUPP.